Sept. 30, 1958 E. J. H. BUSSARD ET AL 2,854,578

OSCILLATOR

Original Filed Oct. 18, 1951 2 Sheets-Sheet 1

INVENTORS.

EMMERY J. H. BUSSARD

REUBEN NATHAN

BY Alden D. Redfield

Charles M. Hogan

ATTORNEYS.

INVENTORS.
EMMERY J. H. BUSSARD
REUBEN NATHAN
BY Alden D Redfield
Charles M. Hogan
ATTORNEYS.

United States Patent Office 2,854,578

Patented Sept. 30, 1958

2,854,578

OSCILLATOR

Emmery J. H. Bussard and Reuben Nathan, Cincinnati, Ohio, assignors to Avco Manufacturing Corporation, Cincinnati, Ohio, a corporation of Delaware Original applications October 18, 1951, Serial No. 251,864, now Patent No. 2,763,776, dated September 18, 1956, and October 29, 1952, Serial No. 319,622. Divided and this application December 15, 1953, Serial No. 406,034

3 Claims. (Cl. 250—36)

The present invention relates to ultra-high-frequency (U. H. F.) converters for television receivers. A U. H. F. converter is a device which selects the radio frequency carrier signals in the desired U. H. F. channel, converts them into first intermediate frequency (I. F.) carrier signals in the very-high-frequency (V. H. F.) range, and then applies the first I. F. output signals to the V. H. F. signal input circuit of a television receiver tuner. A V. H. F. tuner is a unit included in the receiver, comprising preselector circuits, a local oscillator and a mixer functioning cooperatively to select carrier frequency signals in the desired V. H. F. channel, to convert them into intermediate frequency signals (referred to as "second I. F. signals" when a converter is used) and to apply those I. F. signals to the conventional intermeidate frequency amplifier stages of the receiver. When a U. H. F. converter is used in conjunction with a V. H. F. tuner the selector circuits of the V. H. F. tuner are adjusted to receive the V. H. F. signal output of the converter, and the receiver and converter function together as a double superheterodyne receiver.

Subject matter disclosed but not claimed herein is disclosed and claimed in United States Patent 2,763,776, of which the instant application is a division, and in another divisional application which was filed October 29, 1952, and bears Serial No. 319,622, of which the instant application is also a division.

In the illustrative U. H. F. converter herein shown, the frequency of the local oscillator is lower than the frequency of the U. H. F. signal input to the converter, this tuner being intended for use with a receiver having a non-symmetrical intermediate frequency system and a local oscillator operating at higher frequencies than that of the V. H. F. input to the receiver proper. Provision is made in this manner for correct presentation of signals to the intermediate frequency system included in the receiver. In the alternative, when a converter is employed with a receiver in which the local oscillator frequency is lower than the frequencies of the V. H. F. input to the receiver, then the frequency of the local oscillator included in the convertor should be made higher than that of the U. H. F. signal input to the converter.

At the present time channels Nos. 2 through 13 are available in the United States for commercial video broadcasting, with V. H. F. channel frequency allocations as follows:

| Channel No.: | Megacycles |
|---|---|
| 2 | 54–60 |
| 3 | 60–66 |
| 4 | 66–72 |
| 5 | 76–82 |
| 6 | 82–88 |
| 7 | 174–180 |
| 8 | 180–186 |
| 9 | 186–192 |
| 10 | 192–198 |
| 11 | 198–204 |
| 12 | 204–210 |
| 13 | 210–216 |

The complete V. H. F. range comprises a lower V. H. F. band (54–88 megacycles) and an upper V. H. F. band (174–216) megacycles). In the preferred embodiment of the present invention, this factor is exploited to great advantage, the first I. F. output signal frequencies of the converter being in the portion of the spectrum between those two bands. This portion is not used at any place in the United States for video broadcasting.

The present invention generically embraces, but is not specifically limited to, a converter having a V. H. F. signal output frequency within one of the present V. H. F. channels. A converter which is so limited is designed for a very wide bandwidth to provide output I. F. frequencies covering two adjacent V. H. F. channels, so that an alternate channel may be used for U. H. F. reception if the other V. H. F. channel is assigned to the location where the converter is installed. Prior art converters which provide a V. H. F. signal output frequency within the present V. H. F. channels are subject to a further limitation, even when designed to provide output frequencies covering two adjacent V. H. F. channels, because they do not operate in a satisfactory manner in areas wherein both channels are used for V. H. F. reception. Prior art tuners of this character may be tuned to provide output frequencies within either of two present V. H. F. channels. The present invention affords a very significant advantage in that a V. H. F. selector used in conjunction with our novel converter may be adjusted to receive I. F. signals at any point within the receiver pass band, and such selector is not limited to two positions.

The preferred embodiment of the present invention has a narrower bandwidth and is advantageously used with a continuous type of V. H. F. tuner, the output I. F. frequencies being in the portion of the spectrum between the V. H. F. bands, the portion being covered by continuous V. H. F. tuners but not by step-by-step tuners. It is, accordingly, an object of the preferred form of the invention to provide:

First, a converter having a narrower output bandwidth;

Second, a converter which can universally be used with continuous tuners;

Third, a converter which provides output carrier signals in the portion of the spectrum between the V. H. F. bands;

Fourth, a converter which does not require a range of output frequencies covering two adjacent V. H. F. frequencies; and Fifth, a converter having enhanced gain, signal-to-noise ratio and selectivity characteristics.

The Federal Communications Commission presently contemplates the allocation of carrier frequencies from 470 to 890 megacycles to television broadcast transmission and proposes to add to the present V. H. F. channels a total of 70 additional channels, Nos. 14 through 83, comprising the U. H. F. band or range. Upon the completion and final adoption of this allocation plan or a similar proposal, commercially successful television receivers will require:

A combined U. H. F.–V. H. F. tuner for the selection of any one of the very large number of channels within the U. H. F. and V. H. F. ranges, or A U. H. F. converter in combination with a V. H. F. receiver.

U. H. F. converters will then be required in large numbers to adapt V. H. F. receivers to U. H. F. reception. The preferred type of converter in accordance with the invention will have V. H. F. output frequencies between the V. H. F. bands. Other converters, including a modified form in accordance with the invention, will have V. H. F. output frequencies in one of the present V. H. F. channels.

Other important objects of the invention are to provide:

First, a converter which features novel double-tuned bandpass selector and local oscillator circuits;

Second, a converter which minimizes oscillator radiation;

Third, a converter including an oscillator having a novel and particularly stable bridge type feedback system;

Fourth, a converter having uniform mixer excitation from the local oscillator.

For a better understanding of the invention, together with other and further objects, advantages, and capabilities thereof, reference is made to the following description of the accompanying drawings, in which there is shown an oscillator in accordance with the invention:

Figure 1:
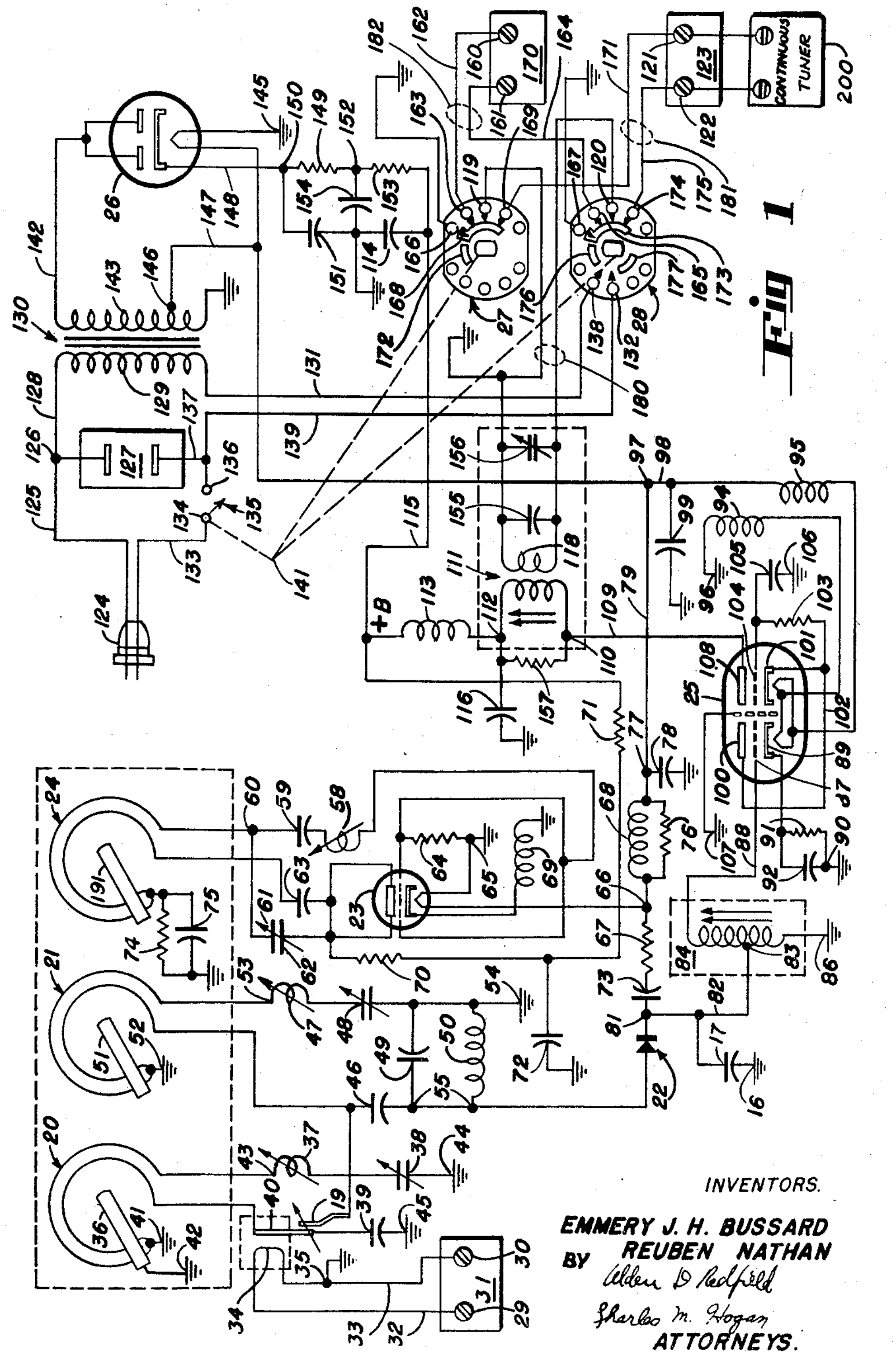
Fig. 1 is an electrical schematic of the circuits included in the converter.

The novel converter unit in accordance with the invention comprises the following major units, all as shown in Fig. 1 and in U. S. Patent 2,763,776, to which reference is made for a description of the entire unit: First, a double-tuned bandpass preselector circuit comprising the tuning lines 20 and 21 and immediately associated components; second, a crystal mixer diode 22 to which the selected radio frequency carrier signals are applied; third, a local oscillator comprising vacuum tube 23, tuning line 24 and associated components for generating local oscillations which are also applied to the crystal mixer to convert, by heterodyne action, the carrier frequency signals into intermediate frequency signals; fourth, a low noise stage of first I. F. power amplification comprising a vacuum tube 25 and associated circuit elements; fifth, a power supply in the form of a half-wave rectifier inclusive of tube 26, functioning as a source of heater and space currents; and sixth, a ganged pair of control switches 27 and 28, manually operable to condition the receiver for ultra-high-frequency operation (U. H. F.) or very-high-frequency operation (V. F. H.).

A suitable UHF antenna is connected to antenna input terminals 29 and 30 mounted on insulating board 31. These terminals are connected by conductors 32 and 33 to the primary of an antenna input transformer, which primary comprises a loop of conductive material 34, one terminal of which is grounded at 35. The first preselector circuit comprises a parallel-conductor type of tuning line 20 which is adjusted by a shortcircuiting bar, indicated by the reference numeral 36, to produce parallel resonant conditions in the tuned circuit comprising tuning line 20, end inductor 37, trimmer capacitor 38, capacitor 39, and metallic plate 40. Plate 40 is a ribbon conductor which serves both as an inductor and as the fixed plate of a capacitor, in furtherance of the two functions of antenna coupling and coupling between the two circuits of the selector network. The closed end of transmission line 20 is grounded at 41, and the adjustable shorting bar is grounded at 42. One terminal of line 20 is connected to plate 40, and the other terminal is connected at point 43 to an adjustable end inductor 37. The remaining terminals of plate 40 and inductor 37 are connected, respectively, to the high potential terminals of capacitor 39 and capacitor 38. Capacitor 38 is adjustable and is connected to ground at 44. The remaining terminal of capacitor 39 is grounded at 45. The antenna input primary 34 is coupled to the first preselector circuit, inclusive of the elements 39, 40, 20, 37, and 38, by the capacitive and mutually inductive relationship existing between loop 34 and plate 40.

The bandpass selector network includes a second tuned preselector circuit comprising tuning line 21 and associated circuit elements 46, 47, 48, 49, and 50. Line 21 is provided with an adjustable shorting bar 51. The closed end of the tuning line is grounded at 52. One terminal of the tuning line is connected to a terminal of capacitor 46. The other terminal of tuning line 21 is connected at 53 to adjustable end inductor 47. Capacitor 48 is connected between grounded point 54 and the remaining terminal of inductor 47. Capacitor 46 projects through the chassis and is connected to crystal 22 at junction 55. Inductance 50 is connected between point 55 and ground, and capacitor 49 is also connected between point 55 and ground. Point 55 is the junction of crystal 22, capacitors 46 and 49, and inductance 50.

The first preselector circuit is coupled to the second preselector circuit by the capacitive and inductive, primarily the capacitive, relationships between plate 40 and plate 19, plate 19 being connected to the junction of capacitor 46 and tuning line 21.

The preselector output is taken from terminals 55 and 54 (ground), and the parallel combination of capacitor 49 and inductor 50 is connected across these terminals.

The preselector circuitry between the antenna input terminals and the mixer 22 having been described in detail, the discussion now proceeds to the oscillator circuit shown in Fig. 1. The oscillator comprises a tube 23 which is placed in a shielding can. The oscillator tube is mounted on a socket. The two oscillator grid terminals are connected to one terminal of an adjustable end inductor 58, the remaining terminal of which is connected to a terminal of capacitor 59. The other terminal of capacitor 59 is connected to tuning line 24 at point 60, and the line is connected at this point to a plate 61 which is mounted in spaced relationship to another plate 62 to form an adjustable capacitor, plate 62 being connected to both oscillator tube anode terminals. Disposed immediately above and adjacent capacitor 59 is a capacitor 63 which connects both anode terminals of tube 23 to the remaining terminal of the tuning line. A grid resistor 64 is connected between the grid terminal of tube 23 and grounded point 65. One of the heater terminals is grounded, and the other heater terminal is connected at 66 to the junction of a resistor 67 and an inductance 68. The cathode terminal is returned to ground through an inductance 69. The anode of oscillator tube 23 is connected to the space current supply source through serially related resistors 70 and 71, a filter capacitor 72 being connected between the junction of these two resistors and ground. The injection circuit between the oscillator and the mixer originates at the oscillator heater and is completed through resistor 67 and capacitor 73, the latter being connected between crystal 22 and resistor 67. Point 81 is the junction of crystal 22 and capacitor 73. A capacitor 17 is connected between point 81 and ground 16.

Between the closed end of tuning line 24 and ground is connected a parallel combination of resistance 74 and capacitance 75. The oscillator tuning line is provided with a shorting bar 191.

The oscillator heater circuit connections to the heater current supply are completed through the parallel combination of inductor 68 and resistor 76 to a terminal 77 (Fig. 1). Inductance 68 is mounted on resistor 76. A shunt capacitor 78 is connected between junction 77 and ground, conductor 79 thence leading to the filament current supply terminal 97.

Coming now to a description of the method by which this converter is aligned, a metering circuit comprising a rectifier and a high-gain oscilloscope is inserted between points 55 and 81 (Fig. 1), and the crystal 22 is open-circuited. Converter power is turned off, and the tuning shaft is turned to the maximum clockwise or highest frequency position, the pointer on the tuning dial (not shown) then being set against a limit stop located slightly to the right of the channel 82 calibration on the dial. Next the dial is set at 700 megacycles, and there is fed to the antenna terminals 29, 30 a high output sweep signal of 685 to 715 megacycles. Trimmer capacitors 38 and 48 are then adjusted to maximum oscilloscope deflection, and capacitor 19, 40 is adjusted until the oscilloscope pass band pattern "flat tops." The dial is then set at 470 megacycles, and a 400 cycle amplitude modulated signal on a 470 megacycle carrier is applied to the antenna input terminals 29, 30. Capacitors 38 and 48 are again adjusted to maximum oscilloscope deflection. Finally the dial is set at 890 megacycles, and a 400 cycle amplitude modulated signal on an 890 megacycle carrier is applied to the U. H. F. antenna input terminals 29, 30, whereupon the end inductors 37 and 47 are adjusted for maximum oscilloscope deflection. The foregoing steps are repeated if necessary. The dial is again set to 700 megacycles and, using a sweep signal of 685 to 715 megacycles, the capacitor 19, 40 is again adjusted until the oscilloscope pass band "flat tops."

The oscillator is now adjusted, power is turned on, and the dial set at the maximum clockwise position. Inductance 58 is then adjusted until the oscillator frequency is 775 megacycles, utilizing an insulated alignment tool. Opening the end inductor 58 lowers the oscillator frequency, and closing it increases that frequency. Finally the dial is set at the maximum counterclockwise position and capacitor 61, 62 is adjusted until the oscillator frequency is 338 megacycles. An oscillator frequency range from 338 to 775 megacycles is appropriate for a converter output signal frequency approximating 127 megacycles.

The converter is connected to a Crosley continuous tuner, adjusted to 127 megacycles, and the converter is turned on. By the use of a traveling detector and band pass indicator, the over-all pass band of the converter is peaked at 124 and 130 megacycles by adjustment of the core of transformer 111, the core of transformer 84, and trimmer capacitor 156. The connections to the Crosley receivers having a Crosley continuous tuner are made with a 300 ohm twin transmission line. Crosley V. H. F. tuners of the type suitable for use in conjunction with this converter, as indicated by the block marked 200 in Fig. 1, are shown in the following patents of Emmery J. H. Bussard, assigned to the same assignee as the present application and invention (to wit, Avco Manufacturing Corporation):

U. S. Patent 2,652,487 "Constant Band Width Coupling Circuit for Television Receiver Tuners," and U. S. Patents 2,615,983, 2,579,789, and 2,711,477, each entitled "Tuner for Television Receivers."

Figures 2, 3:
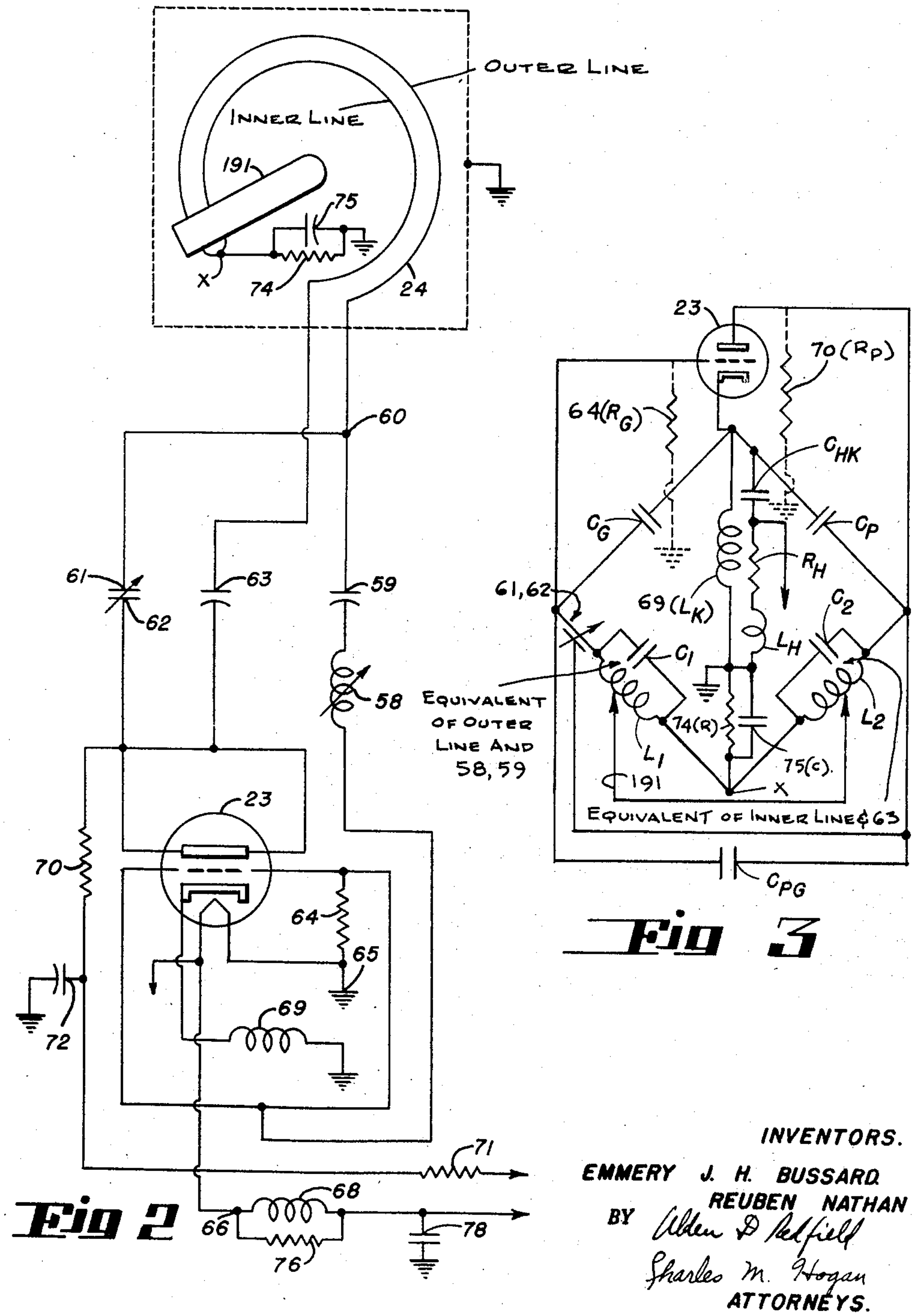
Fig. 2 is a circuit diagram of the novel oscillator included in the converter.
Fig. 3 is an equivalent circuit diagram used as an aid in explaining the operation of the Fig. 2 circuit.

The oscillator generates local oscillations within the frequency range from 338 to 775 megacycles, for a converter output frequency centered at 127 megacycles. The oscillator circuit is illustrated in Fig. 2 and the bridge equivalent in Fig. 3. Connected between the symmetrical anode leads of triode 23 and the symmetrical grid leads of that tube are a series combination of a first capacitor 63, tuning line 24, fixed capacitor 59, and adjustable end inductance 58, the latter comprising a bendable strip of conductive material. The elements 63, 24, 59, and 58 are equivalent to the two arms $L_1$, $C_1$ and $L_2$, $C_2$ of the bridge network shown in Fig. 3. The tuning line is adjustably short-circuited by a shorting bar 191, this element 191 being only symbolically illustrated in Fig. 2. The shorting bar 191, like the other shorting bars, consists of a contact mounted on the end of a suitably insulated arm. The shorting bar is ganged for unicontrol with the preselector shorting bars or contacts. The closed end of the line is connected to ground through a parallel combination of resistor 74 and capacitor 75 (Fig. 2), to provide the parameters R and C represented in Fig. 3. The remaining arms of the bridge are provided by the grid-cathode interelectrode capacitance $C_G$ and the plate-cathode interelectrode capacitance $C_P$ of tube 23, as represented in Fig. 3. A grid resistor 64 is connected between grid and ground, and the anode is connected to the positive power supply line (+B) through a filter network comprising series resistors 70, shunt capacitance 72, and series dropping resistor 71. In this manner the parameters $R_G$ and $R_P$ are effectively provided.

In series between the cathode and ground is a choke 69 shown as $L_K$ in Fig. 3. One terminal of the heater is grounded and the other heater terminal is connected to the ungrounded filament current supply line through a filter comprising: first, a parallel combination including the choke 68 and resistor 76, and second, a shunt capacitor 78. In parallel with the cathode inductance $L_K$ is the series combination of the heater-cathode capacitance $C_{HK}$, the heater resistance $R_H$, and the heater inductance $L_H$.

The circulating current in the oscillator tank circuit, consisting of the reactance arms of the bridge between grid and plate, produces out-of-phase potentials, required to sustain oscillations, at grid and plate. The cathode is tapped in near a null point of the bridge so that the reaction of the cathode and heater circuits on the oscillator tank circuit is minimized. The cathode inductance $L_K$ and heater inductance $L_H$ are resonated by the heater-cathode capacitance of the tube at approximately 700 megacycles. Mixer excitation is derived by coupling through the heater-cathode capacitance, one terminal of the heater being placed in circuit with the crystal mixer 22 by a resistor 67 and a capacitor 73 (Fig. 1).

The preselector circuit coupled to the mixer and the mixer itself have a minimum reaction on the oscillator tank circuit, this desirable result being obtained by taking the oscillator voltage from the heater circuit. The excitation voltage is taken across the parameters $R_H$ and $L_H$, which are representative of the heater resistance, the heater self-inductance, and the self-inductance of the choke 68.

To provide for factory adjustment, trimmer capacitor 61, 62 is connected between the anode of tube 23 and terminal 60 of tuning line 24.

The oscillator injection is relatively uniform across the band. The reaction of the heater inductance increases with frequency and tends to increase the output as the transit-time loading of the input circuit increases. This action compensates for the general tendency toward reduction in oscillator output voltage caused by the decrease in effective $R_G$ at higher frequencies.

As will be seen from an inspection of Fig. 3, this oscillator effectively has plate and grid tank circuits. One of the parameters intercoupling these tank circuits is the plate-grid interelectrode capacitance of tube 23, referred to as $C_{PG}$. Another is the variable capacitor 61, 62. A third is the cathode choke 69 indicated as $L_K$ in Fig. 3. This choke is, of course, a magnetic coupling parameter. It functions to change the feedback ratio as operating frequency is increased, to compensate for transit-time delay effects which increase with increasing frequency. As these effects tend to attenuate the local oscillation output, the feedback ratio is changed to increase the drive on the input of the oscillator tube and to maintain with reasonable consistency the amplitude of the local oscillator output signals.

This oscillator circuit has excellent stability characteristics. In production we minimize oscillator drift by the location of parts, by the use of negative temperature coefficient capacitors 63, 75, 59, and by thermal isolation of the oscillator elements from the heat of tubes 25 and 26.

We have taken full advantage of the symmetrical anode and grid leads of tube 23 and the increase in operating frequency made possible by symmetrical leads and connections in the following manner: As clearly shown by the disposition of the elements 58 and 63 in Fig. 2, we effectively couple a single tuning line 24 into the central points of symmetry of the plate and grid of tube 23, thereby realizing many of the advantages which would otherwise have to be achieved by the provision of two tuning lines in lieu of the single open-wire line 24 which this invention exploits.

The converter or frequency changing stage exploits a germanium crystal mixer 22. Carrier signal input to the mixer is provided by a connection from junction point 55 (of capacitor 49 and inductor 50) to the cathode of the crystal (Fig. 1). In most installations the polarity of the crystal is immaterial. The combination 49, 50, considered alone, is desirably resonant at approximately 310 megacycles. This combination serves two useful purposes: (1) It attenuates oscillator voltages tending to radiate from the antenna, because it serves as an effective short circuit to such voltages, looking from the oscillator into the terminals 55, 54; (2) The signal coupling into the mixer provided by the preselector and this parallel capacitor 49-inductor 50 combination varies automatically with preselector tuning in such a manner as to compensate for the normal decrease in gain which accompanies an increase in signal frequency. The elements 49 and 50 are preferably designed, in conjunction with the preselector, for maximum power transfer of the carrier signals to the mixer. These elements terminate tuning line 21 in such a manner as to provide a proper coupling to a diode mixer. Local oscillation injection into the mixer stage is provided by capacitor 73 and resistor 67, in series with the anode of crystal 22 and the oscillator tube heater, i. e., between junction points 66 and 81. Between point 66 and ground is a series circuit comprising: a parallel combination of inductor 68 and resistor 76, and a capacitor 78.

The mixer and associated circuit elements accomplish in a novel manner the basic functions required of a frequency converter stage in a superheterodyne receiver, to wit: First, the beating of the local oscillator frequency against the input carrier frequency to produce the desired difference frequency output; Second, the presentation of a low input impedance to intermediate frequencies; Third, the presentation of a high input impedance at the mixer to R. F. carrier frequencies and local oscillations; Fourth, the rejection of sum frequencies and input frequency components in the mixer output system; Fifth, the rejection of image frequencies and undesired carrier frequencies preparatory to application of signals to the mixer.

At a given crystal excitation power, the crystal presents one impedance to the carrier frequency circuit and another to the intermediate frequency circuit. With conventional methods of oscillator coupling, the oscillator injection and hence the crystal excitation power would vary over wide limits. We provide a novel oscillator injection circuit which minimizes mismatch and improves mixer performance. Uniform oscillator injection not only minimizes mismatch, but it generally improves the efficiency of mixer performance. One of the major advantages of the crystal mixer is the possibility of supplying a lower excitation power for efficient mixer operation, decreasing oscillator radiation from the antenna.

As indicated above, the excitation voltage from oscillator to mixer is taken off at the oscillator heater socket clip 66 so that the load reflected into the oscillator tank circuit by the mixer and associated circuits is in balanced relationship with respect to the feedback bridge network in the oscillator. Thus the mixer and preselector circuits have a minimum reaction on the oscillator, and uniform mixer excitation, oscillator range and oscillator stability are promoted. It will now be appreciated by those skilled in the art that a minimum of oscillator tank circuit loading is achieved by driving the mixer from a voltage developed in the common leg of the feedback bridge network in the oscillator.

While we do not desire to be limited to a single set of circuit parameters, the following illustrative parameters have been found to be satisfactory in one successful embodiment of the invention:

| | |
|---|---|
| Resistor 149 | 820 ohms. |
| Resistor 153 | 820 ohms. |
| Resistor 157 | 27,000 ohms. |
| Resistor 103 | 10,000 ohms. |
| Resistor 64 | 10,000 ohms. |
| Resistor 70 | 1,800 ohms. |
| Resistor 91 | 220 ohms. |
| Resistor 67 | 180 ohms. |
| Resistor 70 | 1,800 ohms. |
| Resistor 71 | 5,600 ohms. |
| Resistor 76 | 330 ohms. |
| Resistor 74 | 1,000 ohms. |
| Tube 23 | Type 6AF4. |
| Tube 26 | Type 6X4. |
| Tube 25 | Type 6BQ7. |
| Mixer 22 | Type 1N72. |
| Capacitor 39 | 1.5 micromicrofarads. |
| Capacitor 38 | .8–6.5 micromicrofarads, variable. |
| Capacitor 19 | .1–.5 micromicrofarad, variable. |
| Capacitor 34,40 | 1.5 micromicrofarads. |
| Capacitor 46 | 2.2 micromicrofarads. |
| Capacitor 48 | .8–6.5 micromicrofarads, variable. |
| Capacitor 49 | 5 micromicrofarads. |
| Capacitor 59 | 6. micromicrofarads. |
| Capacitor 61 | .1–1.5 micromicrofarads, variable. |
| Capacitor 63 | 12 micromicrofarads. |
| Capacitor 17 | 1.0 micromicrofarad. |
| Capacitor 72 | 470 micromicrofarads. |
| Capacitor 73 | 2.2 micromicrofarads. |
| Capacitor 92 | 4.7 micromicrofarads. |
| Capacitor 78 | 470 micromicrofarads. |
| Capacitor 105 | 1500 micromicrofarads. |
| Capacitor 99 | 1500 micromicrofarads. |
| Capacitor 116 | 1500 micromicrofarads. |
| Capacitor 155 | 150 micromicrofarads. |
| Capacitor 114 | 20 microfarads. |
| Capacitor 151 | 20 microfarads. |
| Capacitor 156 | 20–100 microfarads, variable. |
| Capacitor 154 | 16 microfarads. |
| Inductance 37 | .002–.0045 microhenry self-inductance, variable. |
| Inductance 47 | .002–.0045 microhenry self-inductance, variable. |
| Inductance 58 | .001–.0025 microhenry self-inductance, variable. |
| Inductance 50 | .05 microhenry self-inductance. |
| Inductance 69 | .96 microhenry self-inductance. |
| Inductance 84 | .162 to .238 microhenry self-inductance. |
| Inductance 94 | .095 microhenry self-inductance. |
| Inductance 95 | .095 microhenry self-inductance. |
| Inductance 68 | .9 microhenry self-inductance. |
| Oscillator Tuner: | |
| Distributed capacitance | 3.5 micromicrofarads, maximum. |
| Maximum inductance | .07445 microhenry. |
| Minimum inductance | .033 microhenry. |

| | |
|---|---|
| Preselector Tuners: | |
| Distributed capacitance— | |
| Mixer | 2.0 micromicrofarads. |
| Antenna | 1.7 micromicrofarads. |
| Maximum inductance— | |
| Mixer | .0654 microhenry. |
| Antenna | .0606 microhenry. |
| Minimum inductance— | |
| Mixer | .0314 microhenry. |
| Antenna | 0.323 microhenry. |
| Oscillator range | 338 to 775 megacycles. |
| Converter range | 465 to 902 megacycles. |
| First intermediate frequency | 127.5 megacycles. |
| Over-all gain of converter | 1.2–2.0. |
| Voltages: | |
| Plate, tube **23** | 100 volts. |
| Plate of output section, tube **25** | 225 volts. |
| Cathode of input section, tube **25** | 2.0 volts. |
| Resonance frequencies: | |
| Elements **49, 50** | 310 megacycles. |
| Primary of output transformer | 123 megacycles. |
| Secondary of output transformer | 131 megacycles. |
| Input impedance of V. H. F. receiver | 150 ohms, approximately. |
| Impedance of U. H. F. antenna | 150 ohms, approximately |

While there has been shown and described what is at present considered to be the preferred embodiment of the invention, it will be understood by those skilled in the art that various modifications and changes and substitutions of equivalents may be made therein within the true scope of the invention as defined by the appended claims.

Having fully disclosed and described our invention, we claim:

1. In a bridge-type oscillator for a converter, a vacuum tube having at least cathode, control and anode electrodes and a separate heater, a heater choke connected to said heater, a frequency determining tank comprising a short-circuited tuning line coupled between said anode and control electrodes to constitute two arms of a bridge network, said bridge network being completed by grid-cathode and plate-cathode capacitances, and means for providing a high impedance direct current path across said bridge, the last-mentioned means comprising a cathode choke connected between said cathode and ground and a parallel resistance-capacitance combination connected between ground and the closed end of said tuning line, whereby such means offers a high impedance to bridge unbalance, the heater circuit resistance and inductance parameters and the inherent heater-cathode capacitance paralleling said cathode choke to provide a junction point for driving a mixer, said cathode and heater chokes being resonated within the range of operating frequencies.

2. In a bridge-type oscillator for a converter, a vacuum tube having at least cathode, control and anode electrodes and a separate heater, a frequency determining tank comprising a short-circuited tuning line coupled between said anode and control electrodes to constitute two arms of a bridge network, said bridge network being completed by grid-cathode and plate-cathode capacitances, and means for providing a direct current path across said bridge, the last-mentioned means comprising a cathode choke connected between said cathode and a point of reference potential and a parallel resistance-capacitance combination connected between said point of reference potential and the closed end of said tuning line, whereby such means offers a high impedance to bridge unbalance, the heater resistance and inductance parameters and the inherent heater-cathode capacitance paralleling said cathode choke to provide a junction point for driving a mixer.

3. In a bridge-type oscillator for a converter, a vacuum tube having at least cathode, control and anode electrodes and a separate heater, a frequency determining tank comprising a short-circuited tuning line coupled between said anode and control electrodes to constitute two arms of a bridge network, said bridge network being completed by grid-cathode and plate-cathode capacitances, and means for providing a direct current path across said bridge, the last-mentioned means comprising a cathode choke connected between said cathode and a point of reference potential and a parallel resistance-capacitance combination connected between said point of reference potential and the closed end of said tuning line, whereby the leg comprising such means offers a high impedance to bridge unbalance, and means for driving a mixer from said leg.

References Cited in the file of this patent

UNITED STATES PATENTS

| | | |
|---|---|---|
| 2,104,916 | Evans | Jan. 11, 1938 |
| 2,405,229 | Mueller et al. | Aug. 6, 1946 |
| 2,440,308 | Storck | Apr. 27, 1948 |
| 2,551,228 | Achenbach | May 1, 1951 |
| 2,602,139 | Hodder et al. | July 1, 1952 |
| 2,618,748 | Rust et al. | Nov. 18, 1952 |
| 2,740,889 | Eckert | Apr. 3, 1956 |
| 2,763,776 | Bussard et al. | Sept. 18, 1956 |